Patented Feb. 11, 1930

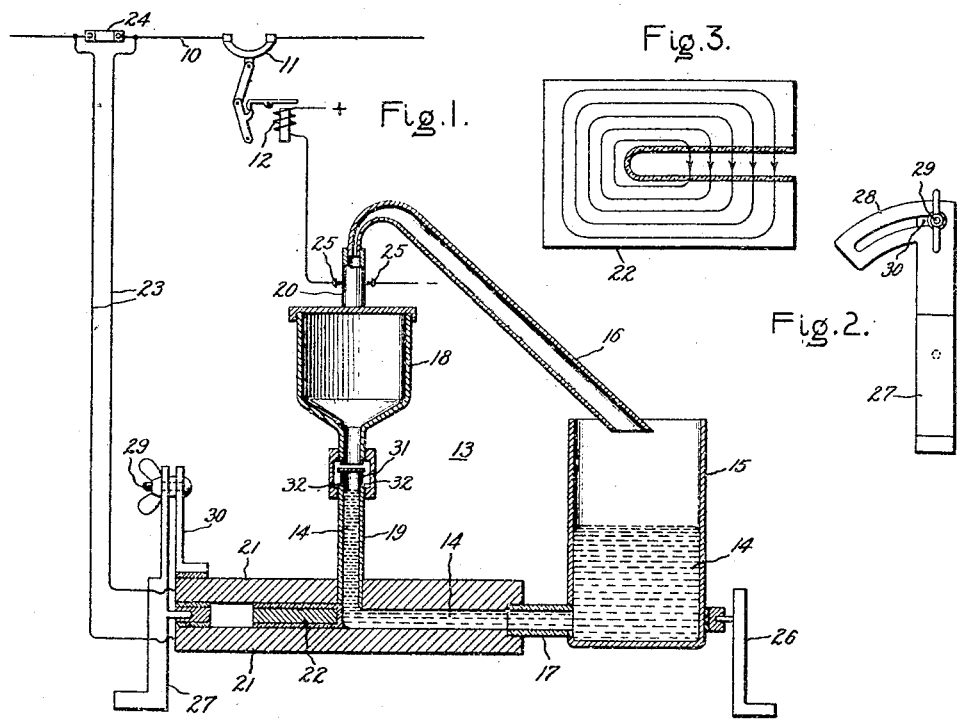
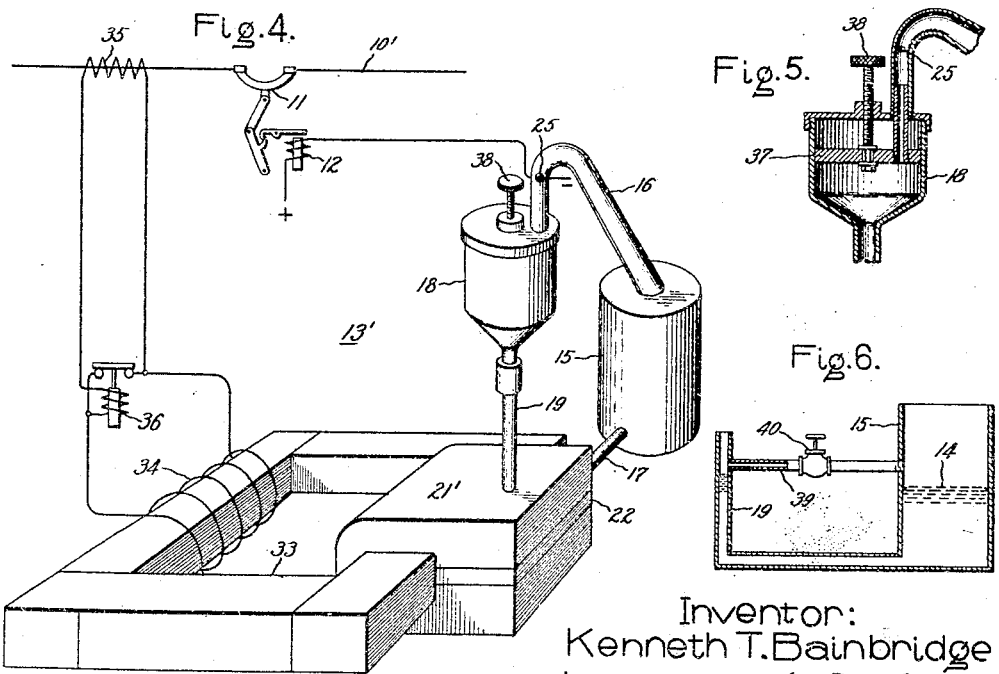

1,747,044

UNITED STATES PATENT OFFICE

KENNETH T. BAINBRIDGE, OF NEW YORK, N. Y., ASSIGNOR TO GENERAL ELECTRIC COMPANY, A CORPORATION OF NEW YORK

CIRCUIT-CONTROLLING APPARATUS

Application filed September 28, 1926. Serial No. 138,324.

My invention relates to improvements in circuit controlling apparatus and more particularly to the control of electric circuits on the occurrence of predetermined conditions either substantially instantaneously or in a time which is a function of an electric quantity of the circuit. An object of my invention is to provide improved circuit controlling apparatus whose operation is practically unaffected by wave form, frequency and temperature and which imposes a small burden on the circuit and has relatively few moving parts.

My invention will be better understood from the following description when considered in connection with the accompanying drawing, and its scope will be pointed out in the appended claims.

In the accompanying drawing, Fig. 1 illustrates, partly diagrammatically and partly in cross section circuit controlling apparatus embodying my invention; Figs. 2 and 3 are details of parts of the apparatus shown in Fig. 1; Fig. 4 illustrates a modification of my invention, Fig. 5 is a detail of a part of the apparatus shown in Fig. 4, and Fig. 6 illustrates a modification of a part of my invention.

My invention is based on the principle that when a conductor carries current and is subjected to a magnetic flux perpendicular to the direction of the current, there is a force tending to move the conductor in a direction perpendicular to the directions of both the current and the flux. My present invention also employs in part a fluid conductor pump such as disclosed in my copending application Serial No. 112,406, filed May 28, 1926 and assigned to the same assignee as this invention, now Patent No. 1,660,407, issued February 28, 1928.

Referring now to Fig. 1, an electric circuit 10, which for illustration may be considered as a direct current circuit, is provided with suitable circuit interrupting means such as a circuit breaker 11 having a trip coil 12. For controlling the circuit breaker 11 in response to predetermined circuit conditions in accordance with an electric quantity of the circuit such as the current, voltage, etc., I provide an electroresponsive device 13 which, as shown, is arranged to be energized in accordance with the current in the circuit 10.

This device 13 comprises a fluid conductor 14 such as mercury which is arranged to be actuated electrodynamically in accordance with my invention. A conduit for the fluid conductor 14 comprises a reservoir 15, an inlet 16 thereto and an outlet 17 therefrom, and an enlarged portion 18 for providing volumetric capacity, an inlet 19 thereto and an outlet 20 therefrom.

For causing the flow of the fluid conductor 14 in accordance with a current which may be derived from the circuit 10, a portion of the conduit between the outlet 17 and the inlet 19 is formed between electric current conducting members such as copper plates 21 between which is mounted a U-shaped magnetic member 22. In order to obtain maximum efficiency, this member is suitably insulated from the plates 21 and the fluid conductor 14 so that none of the current in the conductor or in the plates 21 flows through it. These plates 21, as shown in Fig. 1, may be connected directly in series with the circuit 10 or as shown through leads 23 across suitable voltage drop producing means such as a shunt 24 so that a current proportional to the current in the circuit 10 flows from one plate 21 across the fluid conductor 14 between the plates and the magnetic member 22 to the other plate. With this construction, it is obvious that a portion of the fluid conductor 14 forms a part of the electric circuit which includes the plates 21. Furthermore, the magnetic member 22 and the plates 21 comprise an electromagnetic means for directing across the conductor 14 the flux due to the current in the conductor. There is thus provided a force or pressure on the conductor 14 tending to cause the conductor to flow from the reservoir 15 into the enlarged portion 18 at a rate dependent on the current in the circuit 10.

For controlling the circuit breaker 11 in accordance with this flow or pressure head, cooperating contacts 25 arranged to control the circuit of the trip coil 12 may be mounted in and insulated from the outlet 20 when a time limit action is desired. Then, on the occurrence of current in the circuit 10 in excess of a predetermined value, the contacts 25 will be bridged by the fluid conductor 14 after a time dependent on the height of the contacts and the volume of the fluid conductor 14 that has to be pumped. In order to vary the time, the volumetric capacity of the enlarged conduit portion 18 may be varied or the height of the contacts changed or both. In Fig. 1, I have shown an arrangement for doing both, the outlet portion 20 being offset from the center of the enlarged portion 18 to assist in this purpose. For doing these two things, the device 13 may be pivoted on trunnion supports 26 and 27, the latter of which may have a slotted arcuate portion 28 arranged to receive a clamping screw 29 which is mounted in a support 30 secured to the upper plate 21. The arcuate portion 28 may, of course, be suitably graduated, as desired. Where substantially instantaneous action is desired, the contacts 25 may be mounted in the inlet portion 19 just above the level of the surface of the fluid conductor 14 under normal circuit conditions.

In order to control the flow of the fluid conductor 14, an orifice plate 31 may be mounted in the conduit inlet portion 19. This plate 31, in order to prevent cumulative action on closely occurring overcurrent surges for example and to provide a quick return of the fluid conductor, may be constructed as shown, so as to be biased by gravity and the down flow of the fluid conductor to provide a large down flow opening but to be raised by the fluid conductor 14 on upward flow thereof so as to provide a relatively small upward flow opening. For this purpose, the orifice plate 31 may normally rest on spaced arms 32 arranged in the upper end of the conduit inlet portion 19 and of such length and spacing as to provide the desired down flow opening. The time of operation can also be varied by using plates 31 with different sizes of orifices.

While in Fig. 1 I have discussed my invention as applied to a direct current circuit 10, it is, of course, obvious that this modification of my invention is also applicable to alternating current circuits since the flux across and the current in the fluid conductor 14 reverse simultaneously.

In the modification of my invention shown in Fig. 4, the circuit 10' is assumed to be an alternating current circuit and the copper plates 21 are replaced by an electric current conducting member such as a copper strap 21' which, with the portion of the fluid conductor in circuit therewith, forms a single turn secondary winding of a transformer having a core 33 and a primary winding 34. This winding, as shown, is connected to be energized in accordance with an electric quantity such as the current of the circuit 10' through a current transformer 35. The primary winding 34 may be normally energized or energized only on the occurrence of predetermined circuit conditions. In the latter case, suitable controlling means responsive to the circuit condition, such as an overcurrent relay 36, in circuit with the transformer 35 may be provided. This relay 36, through its contacts, may normally short circuit the primary winding 34, but on the occurrence of current equal to or in excess of the value for which it is set to operate, will start the operation of the device 13'.

By having the core 33 arranged to saturate at some predetermined current in the primary winding 34, any larger current will not appreciably increase the current in the secondary winding formed by the conducting strap 21' and the fluid conductor in circuit therewith. In this way the device 13' may be given an inverse definite time characteristic, that is, inverse time for all currents below the predetermined value, necessary to saturate, and definite time for all values in excess of the saturating value. By setting the relay 36 to operate at the saturating current value, a substantially definite time characteristic may be obtained.

Instead of rotating the device to obtain a time delay adjustment as in Fig. 1, I may vary the volumetric capacity of the enlarged conduit portion 18 by adjustably mounting therein, as shown in Fig. 5, a diaphragm 37 whose position can be varied by the screw 38. In this way, the amount of the fluid conductor that needs to be pumped to bridge the contacts 25 and therefore the time of operation of the device 13' can be varied. I may also control the time limit adjustment as shown in Fig. 6 by a bypass 39 between the reservoir 15 and the inlet 19. This bypass 39 may be provided with suitable means such as a valve 40 to control the amount of the fluid conductor 14 bypassed.

In the modification shown in Fig. 1, the reservoir 15 is open to the air at the top and when mercury is used for the fluid conductor, a layer of some suitable fluid such as oil may be used on top of the mercury to avoid oxidation effects. In the modification shown in Fig. 4, the conduit is sealed and may be evacuated or filled with a suitable gas, such as hydrogen, above the mercury.

In order to prevent sludging of the fluid conductor when mercury is used and the conducting members 21, 21' are copper, these members are preferably coated with a surface that does not amalgamate with mercury and yet does present a good contact. Platinum and iron can be used for this purpose, but the former is preferable, since iron, even though in the so-called non-magnetic forms, would bypass some of the flux that should be providing the magnetic field across the slot or opening between the conducting members and the magnetic member 12 through which the fluid conductor flows.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is,—

1. A time element electroresponsive device including a fluid conductor, a conduit for said conductor, cooperating contacts mounted in said conduit, and means for causing the flow of said conductor whereby to control said contacts in a time dependent on the rate of flow of the conductor including an electric circuit of which a portion of said conductor forms a part, and magnetic means for directing across the conductor the flux due to current in the conductor whereby to cause the flow of said conductor in accordance with the current conducted thereby.

2. An electroresponsive device including a fluid conductor, a conduit for said conductor, cooperating contacts controlled by said conductor upon the flow thereof, and means for causing the flow of said conductor including an electric circuit of which a portion of said conductor forms a part and magnetic means for directing across the conductor the flux due to current in the conductor.

3. A time element electroresponsive device comprising a fluid conductor, a conduit for said conductor, cooperating contacts controlled by said conductor upon the flow thereof and means for causing the flow of said conductor comprising an electric circuit of which a portion of the conductor forms a part, magnetic means for directing across the conductor the flux due to current in the conductor and means adapted to be operated to vary the time for controlling said contacts independently of the rate of flow of the conductor.

4. A time element electroresponsive device comprising a fluid conductor, a conduit for said conductor having an enlarged portion to provide volumetric capacity, contacts mounted in the outlet from said enlarged portion and means for causing the flow of said fluid conductor whereby to control said contacts in a time dependent on said volumetric capacity including an electric circuit of which a portion of said fluid conductor on the inlet side of said enlarged conduit portion forms a part and means for subjecting said fluid conductor to a magnetic field substantially perpendicular to the direction of the current in the conductor.

5. A time element electroresponsive device comprising a fluid conductor, a conduit for said conductor having an enlarged portion to provide volumetric capacity, contacts mounted in the outlet from said enlarged portion and means for causing the flow of said fluid conductor whereby to control said contacts in a time dependent on said volumetric capacity comprising an electric circuit of which a portion of said fluid conductor on the inlet side of said enlarged conduit portion forms a part, means for subjecting said fluid conductor to a magnetic field substantially perpendicular to the direction of the current in the conductor, and means for varying said volumetric capacity.

6. In combination, an electric circuit, means for interrupting the circuit, electromagnetic means for controlling said interrupting means including a fluid conductor element and a magnetic element for subjecting said fluid conductor element to a magnetic field, and means for controlling the energization of one of said elements in accordance with an electric quantity of the circuit including a relay connected and arranged to operate in response to a predetermined condition of the circuit.

7. A time element electrosponsive device comprising a fluid conductor, a conduit for said conductor having an enlarged portion to provide volumetric capacity, cooperating contacts mounted in the outlet from said enlarged portion and means for causing the flow of said conductor whereby to control said contacts in a time dependent on the rate of flow of the conductor and said volumetric capacity comprising an electric circuit of which a portion of said conductor forms a part and magnetic means for directing across the conductor the flux due to current in the conductor whereby to cause the flow of said conductor in accordance with the current conducted thereby.

8. A time element electroresponsive device comprising a fluid conductor, a conduit for said conductor having an enlarged portion to provide volumetric capacity, cooperating contacts mounted in the outlet from said enlarged portion and means for causing the flow of said conductor whereby to control said contacts in a time dependent on the rate of flow of the conductor and said volumetric capacity comprising an electric circuit of which a portion of said conductor forms a part, magnetic means for directing across the conductor the flux due to current in the conductor whereby to cause the flow of said conductor in accordance with the current conducted thereby, and means for varying the time of controlling said contacts.

In witness whereof, I have hereunto set my hand this 24th day of September, 1926.

KENNETH T. BAINBRIDGE.